US010120366B2

(12) United States Patent
Haas et al.

(10) Patent No.: US 10,120,366 B2
(45) Date of Patent: Nov. 6, 2018

(54) AUTOMATIC MACHINE TOOL COOLANT MIXER

(71) Applicant: Haas Automation, Inc., Oxnard, CA (US)

(72) Inventors: Gene F. Haas, Camarillo, CA (US); Kurt P. Zierhut, Camarillo, CA (US); Don P. Earl, Oxnard, CA (US); Leonid Yukhtman, Encino, CA (US)

(73) Assignee: Haas Automation, Inc., Oxnard, CA (US)

( * ) Notice: Subject to any disclaimer, the term of this patent is extended or adjusted under 35 U.S.C. 154(b) by 258 days.

(21) Appl. No.: 14/848,208

(22) Filed: Sep. 8, 2015

(65) Prior Publication Data
US 2016/0070274 A1   Mar. 10, 2016

Related U.S. Application Data

(60) Provisional application No. 62/047,543, filed on Sep. 8, 2014.

(51) Int. Cl.
*G05B 19/404* (2006.01)
*G05D 11/13* (2006.01)
*B23Q 11/10* (2006.01)

(52) U.S. Cl.
CPC ........ *G05B 19/404* (2013.01); *B23Q 11/1061* (2013.01); *G05D 11/138* (2013.01); *G05B 2219/50248* (2013.01)

(58) Field of Classification Search
CPC ........ G05B 19/404; G05B 2219/50248; B23Q 11/1061; G05D 11/138

(Continued)

(56) References Cited

U.S. PATENT DOCUMENTS

| 6,241,432 | B1 * | 6/2001 | Sasanecki | ............ | B23Q 1/0018 137/884 |
| 2008/0049548 | A1 * | 2/2008 | Kadyk | .................. | B01F 3/0861 366/165.1 |

(Continued)

*Primary Examiner* — Robert E Fennema
*Assistant Examiner* — Jigneshkumar C Patel
(74) *Attorney, Agent, or Firm* — Morgan, Lewis and Bockius LLP

(57) ABSTRACT

A machine tool coolant supply system includes a chassis configured to mount the coolant supply system to a coolant storage tank of a machine tool. The coolant supply system further includes a concentrate tank arranged within the chassis, a first flow control valve coupled to the concentrate tank, a second flow control valve coupled to a water supply line, and a mixer configured to mix a concentrate with water. The mixer includes a first inlet coupled to the first flow control valve and configured to receive the concentrate from the concentrate tank via the first flow control valve, a second inlet coupled to the second flow control valve and configured to receive the water from the water supply line via the second flow control valve, and an outlet configured to dispense a mixture of the concentrate and the water into the coolant storage tank of the machine tool. The coolant supply system further includes a control line arranged in electrical communication with the first flow control valve and the second flow control valve, wherein the control line is configured to communicate control signals from a machine tool control system to actuate the first flow control valve and the second flow control valve to control a ratio of the concentrate and the water supplied to the mixer.

15 Claims, 7 Drawing Sheets

(58) Field of Classification Search
USPC .......................................................... 700/285
See application file for complete search history.

(56) References Cited

U.S. PATENT DOCUMENTS

| | | | |
|---|---|---|---|
| 2010/0101929 A1* | 4/2010 | Kamen | B01D 1/28 202/185.3 |
| 2012/0315104 A1* | 12/2012 | Tagashira | B23Q 11/1061 409/136 |
| 2014/0091105 A1* | 4/2014 | Schroeder | B67D 1/004 222/129.2 |
| 2014/0266574 A1* | 9/2014 | Whitson, Jr. | G01F 23/0069 340/5.1 |
| 2014/0271002 A1* | 9/2014 | Hoshino | B23Q 11/10 408/56 |
| 2015/0204165 A1* | 7/2015 | Yeung | E21B 21/062 166/244.1 |

* cited by examiner

AUTOMATIC MACHINE TOOL COOLANT MIXER

This application claims the benefit of U.S. Provisional Application No. 62/047,543, titled "AUTOMATIC MACHINE TOOL COOLANT MIXER" and filed on Sep. 8, 2014, which is incorporated by reference herein.

BACKGROUND

The present disclosure relates to machine tool cooling systems, and more particularly to an automatic coolant mixer for maintaining coolant levels during operation of a machine tool.

Machine tools, such as a mill or lathe, use a variety of cutting tools to shape and finish a workpiece into a desired form. Coolant may be applied to the cutting tool and/or workpiece during operation to protect the cutting tool and the finish of the workpiece. Coolant stored in a coolant tank of a machine tool must be maintained on a regular basis to maximize coolant life, to achieve optimal cutting performance and to prevent damaging the cutting tool or other components of the machine tool. For instance, coolant chemistry that has drifted out of balance can lead to accelerated oxidation of the machine components and in some cases can cause discoloration of the finished part. The most pressing challenge for a machine tool operator regarding the cooling system is in maintaining the coolant level and proper concentration of coolant in the coolant storage tank. If these two aspects of coolant maintenance are satisfied, remaining concerns are reduced to periodic checking of the coolant pH levels and adhering to a clean-out schedule that includes periodic coolant replacement.

SUMMARY

According to aspects of the subject technology, a machine tool coolant supply system includes a chassis configured to mount the coolant supply system to a coolant storage tank of a machine tool. The coolant supply system further includes a concentrate tank arranged within the chassis, a first flow control valve coupled to the concentrate tank, a second flow control valve coupled to a water supply line, and a mixer configured to mix a concentrate with water. The mixer includes a first inlet coupled to the first flow control valve and configured to receive the concentrate from the concentrate tank via the first flow control valve, a second inlet coupled to the second flow control valve and configured to receive the water from the water supply line via the second flow control valve, and an outlet configured to dispense a mixture of the concentrate and the water into the coolant storage tank of the machine tool. The coolant supply system further includes a control line arranged in electrical communication with the first flow control valve and the second flow control valve, wherein the control line is configured to communicate control signals from a machine tool control system to actuate the first flow control valve and the second flow control valve to control a ratio of the concentrate and the water supplied to the mixer.

According to aspects of the subject technology, a machine tool includes a cutting tool, a cooling system comprising a coolant storage tank and a pump, and a control system configured to control operation of the cutting tool to remove material from a workpiece and operation of the pump to supply coolant from the coolant storage tank to one of the cutting tool or the workpiece during operation of the cutting tool. The machine tool further includes a coolant supply system that comprises a concentrate tank and a multi-valve manifold configured to mix a concentrate from the concentrate tank with water received via a water supply line into a coolant and dispense the coolant into the coolant storage tank. The control system is further configured to control the coolant supply system to automatically mix and dispense the coolant into the coolant storage tank based on operating parameters of the machine tool.

According to aspects of the subject technology, a computer-implemented method includes determining a current amount of coolant stored in a coolant storage tank, determining a specified concentration of a coolant for supply to a cutting tool of a machine tool during operation of the cutting tool, and actuating a multi-valve manifold to mix a concentrate from a concentrate tank and water from a water supply line into the coolant at a ratio based on the specified concentration and a volume based on the current amount of coolant stored in the coolant storage tank. The multi-valve manifold is automatically actuated and the coolant dispensed into the coolant storage tank based upon the determined current amount coolant.

Additional, features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
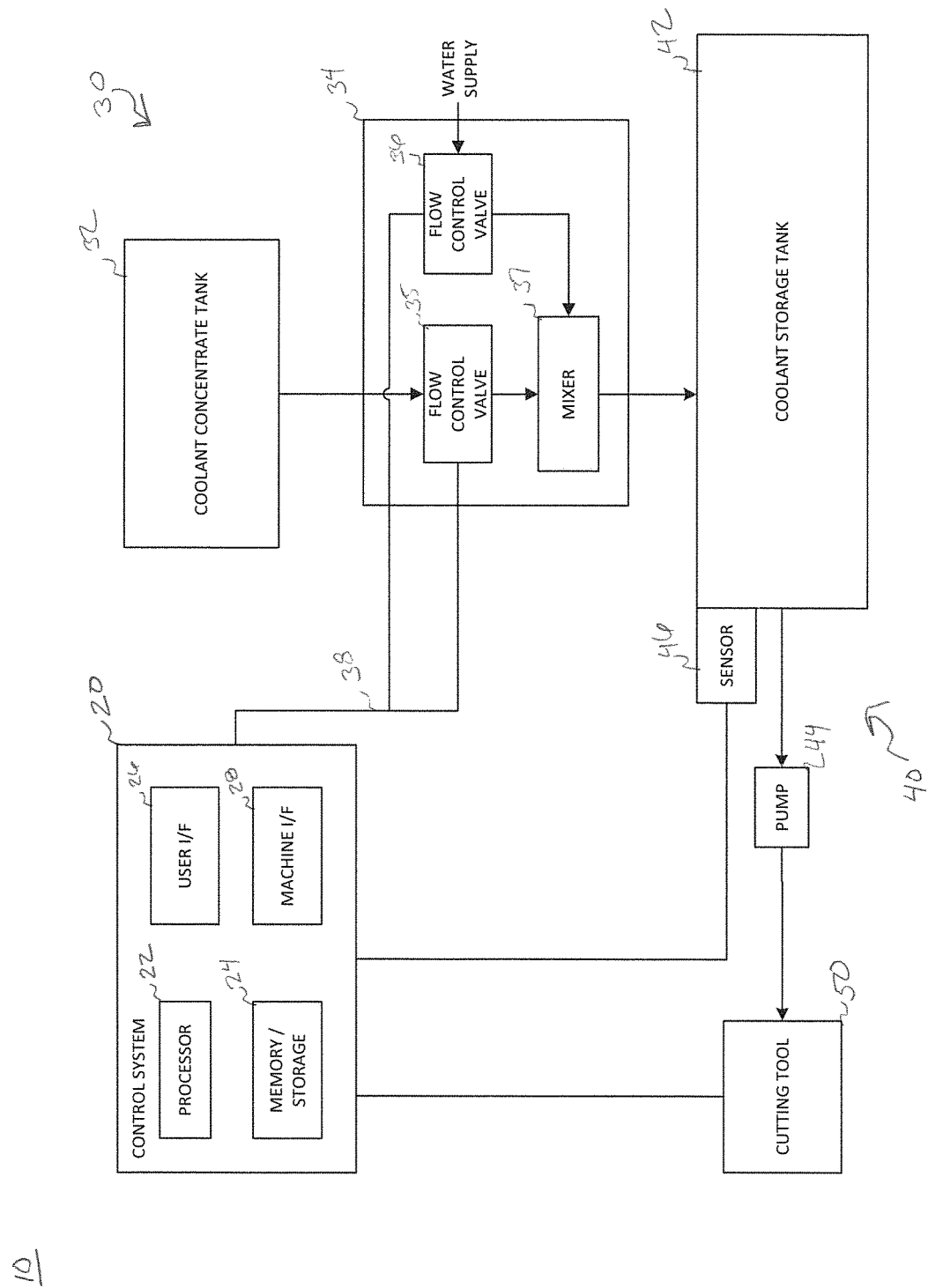
FIG. 1 is a block diagram illustrating components of a computer numerical control (CNC) machine tool incorporating an automatic coolant supply system according to aspects of the subject technology.

FIG. 1 is a block diagram illustrating components of computer numerical control (CNC) machine tool 10 incorporating an automatic coolant supply system according to aspects of the subject technology. As illustrated in FIG. 1, machine tool 10 includes control system 20, coolant supply system 30, cooling system 40, and cutting tool 50. FIG. 1 represents one example of a CNC machine tool; however, the subject technology is not limited to the example shown in FIG. 1. Other machine tools incorporating automatic coolant supply systems according to the subject technology may include additional components and/or may arrange the components in a different manner.

Control system 20 includes processor 22, memory/storage 24, user interface (I/F) 26 and machine interface (I/F) 28. The components of the control system may be interconnected via one or more buses that facilitate the communication of data, commands and/or control signals between the components as well as the communication of data, commands and/or control signals between control system 20 and other components of machine tool 10. The subject technology may use a control system with different components and/or different arrangements of components, including additional processors, interfaces, memory/storage, etc.

Processor 22 represents one or more processors/microprocessors configured to read instructions and data stored in memory/storage 24 and execute the instructions to perform the operations of the subject technology described herein. Memory/storage 24 represents volatile and/or non-volatile machine-readable media storing the instructions and data used by processor 22 to perform the operations. Volatile machine-readable media include random access memory (RAM), static random access memory (SRAM), etc. Non-volatile machine-readable media include magnetic media, electronic media such as flash memory, optical media, etc. Memory/storage 24 may comprise any combination of these and other types of machine-readable media arranged to store and provide access to instructions and data.

User I/F 26 provides an interface between an operator of machine tool 10 and control system 20. User I/F 26 may include a display configured to display a graphical user interface to allow the operator to monitor the status of machine tool 10 and its various components during operation of machine tool 10. User I/F 26 also may include one or more user input devices to allow the operator to select programs/operations to be run on machine tool 10 and to enter commands and operating parameters into control system 20. The input devices may include a keyboard, a pointing device (mouse), a touch screen, etc.

Machine I/F 28 provides an interface between control system 20 and the other components of machine tool 10, such as coolant supply system 30, cooling system 40 and cutting tool 50. Machine I/F 28 may receive status/measurement/positioning signals from the other components and output control signals to the other components. The receipt and processing of the signals may be managed/performed by processor 22 according to instructions loaded and executed by processor 22. Similarly, the generation and transmission of the control signals may be managed/performed by processor 22 according to instructions loaded and executed by processor 22.

Coolant supply system 30 represents a system for mixing a coolant concentrate with water to make coolant based on a specified concentration and dispensing the mixed coolant into coolant storage tank 42 of cooling system 40. The mixing and dispensing may be done automatically according to operating parameters of machine tool 10, as discussed in more detail below. Coolant supply system 30 includes coolant concentrate tank 32, multi-valve manifold 34 and control line 38. Multi-valve manifold 34 is controlled by control system 20 via control line 38 to mix the concentrate stored in concentrate tank 32 with water based on a specified concentration.

Concentrate tank 32, as well as of the other components of coolant supply system 30, may be arranged within a chassis configured to mount coolant supply system 30 to coolant storage tank 42 or other components of machine tool 10. Concentrate tank 32 is not limited to any particular shape, size or material, all of which may vary depending on the type of concentrate, the configuration of machine tool 10, operation cycles of machine tool 10, etc. Any of a number of different types of coolant concentrates may be stored in concentrate tank 32 for use during operation of cutting tool 50. In general, the coolant concentrate may be a water-miscible fluid including soluble oils, synthetics, and/or semi-synthetics. The type of coolant concentrate may vary depending on the type of cutting tool 50, the type of material of a workpiece being machined using cutting tool 50, the types of operations used to machine the workpiece, etc.

Multi-valve manifold 34 includes first flow control valve 35, second flow control valve 36 and mixer 37. First flow control valve 35 is coupled to concentrate tank 32 and configured to receive concentrate stored in concentrate tank 32 and deliver the concentrate to a first inlet of mixer 37 coupled to first flow control valve 35 upon actuation of first flow control valve 35. Similarly, second flow control valve 36 is coupled to a water supply line that is coupled to and receives water from a water source, such as a city/municipal water line, and is configured to deliver the water to a second inlet of mixer 37 coupled to second flow control valve 36 upon actuation of second flow control valve 36. A more detailed example of multi-valve manifold 34 is provided below.

Control line 38 electrically connects first flow control valve 35 and second flow control valve 36 with control system 20 to facilitate electrical communication of control signals between the components. The first and second control valves are not limited to any particular type of valve. Possible valve types include, but are not limited to, diaphragm, ball, gate, butterfly, etc. The valves may be opened and closed, either completely or to varying degrees, using solenoids, actuators, positioners, etc., which may be actuated by control system 20 using control signals communicated via control line 38. Pulse rates of the control signals may be varied (e.g., range of 0.25 seconds to 2 seconds) to control the amount of concentrate and/or the amount of water delivered via the flow control valves to mixer 37. The control signals may be adjusted (e.g., varying pulse rates) to account for different sizes, materials, arrangements, etc. of the delivery paths for the concentrate and the water within coolant supply system 30. These adjustments may be based on measurements, observations, trial-and-error runs, etc. done at initial set up and/or at the time of system maintenance/calibration. In this manner, a ratio of concentrate to water is controllable by control system 20 to produce coolant at a particular concentration level for dispensing into coolant storage tank 42.

Cooling system 40 represents a system for storing and delivering coolant to components of machine tool 10, such as cutting tool 50, during operation of machine tool 10. Cooling system 40 includes coolant storage tank 42, a delivery mechanism, such as pump 44, filtration mechanism(s) (not shown) for filtering the coolant during operation, and removal mechanism(s) (not shown) for removing debris that may be present in the coolant as it is supplied to cutting tool 50 and returned to coolant storage tank 42 for recirculation. Various types of filtration and removal mechanisms may be used within the scope of the subject technology, each type having different effectiveness for separating the debris from the coolant and returning the filtered coolant back to coolant storage tank 42.

Cooling system 40 also may include sensor 46 arranged in or adjacent to coolant storage tank 42 to detect a level of coolant stored in coolant storage tank 42. Sensor 46 is not limited to any particular type of sensor and may include float-type sensors, optical sensors, capacitive/conductive type sensors, etc. arranged to sense the current level of coolant. Sensor 46 also may include other types of sensors (e.g., refractometer, spectrometer, etc.) to detect properties of the coolant stored in coolant storage tank 42. For example, sensor 46 may include components configured to determine a concentration level of the coolant or other properties of the coolant such as pH level. The coolant sensor is configured to supply the detected level and/or coolant properties to control system 20 for processing in the algorithms described herein.

Cutting tool 50 represents any tool used to remove material from a workpiece. Cutting tool 50 may include a spindle for rotating a tool relative to the workpiece, such as in a mill, or cutting tool 50 may rotate the workpiece and move the tool relative to the rotating workpiece to remove material, such as in a lathe. Pump 44 may supply coolant from coolant storage tank 42 to cutting tool 50 to cool and clean the surface of the tool at the point of contact with the workpiece during operation of cutting tool 50. The operation of cutting tool 50 is controlled by control system 20 according to programs/instructions loaded and executed within control system 20.

Figure 2:
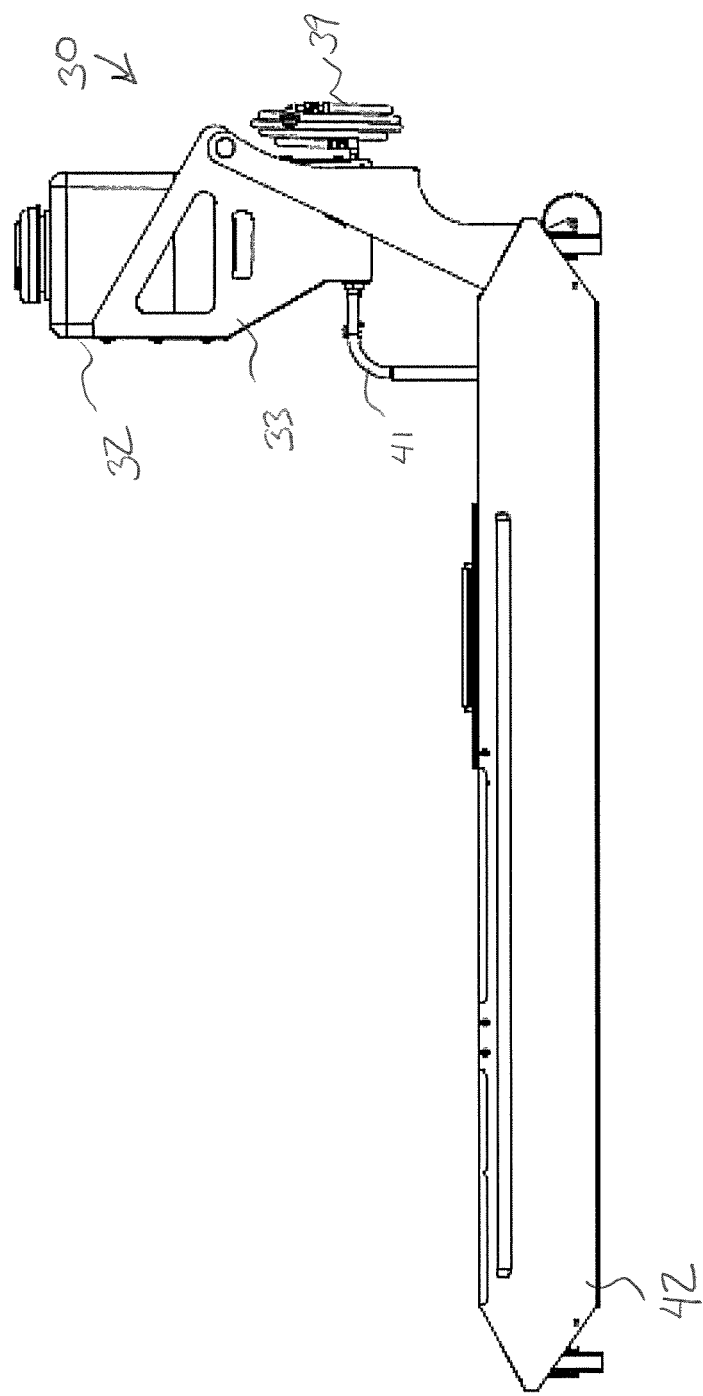
FIG. 2 is a profile view of a coolant storage tank with a coolant supply system mounted thereon according to aspects of the subject technology.

FIG. 2 is a profile view of coolant storage tank 42 with coolant supply system 30 mounted thereon according to aspects of the subject technology. As illustrated in the figure, coolant supply system 30 includes coolant concentrate tank 32 arranged within chassis 33. Concentrate tank 32 may sit within chassis 33 on supports or a platform or may be attached to chassis 33 using fastening mechanisms such as screws or bolts. In this particular example, chassis 33 is configured to detachably mount to a handle of coolant storage tank 42. Also depicted in the figure are water supply line 39, configured to be connected to a water source to supply water to coolant supply system 30, and coolant dispensing line 41 arranged to dispense the mixed coolant into coolant storage tank 42. As illustrated, coolant storage tank 42 is arranged on casters or wheels that allow coolant storage tank 42 to be positioned within machine tool 10 and removed as needed for maintenance or repair. FIG. 2 depicts only one example arrangement is not intended to limit the arrangements within the scope of the subject technology.

Figure 3:
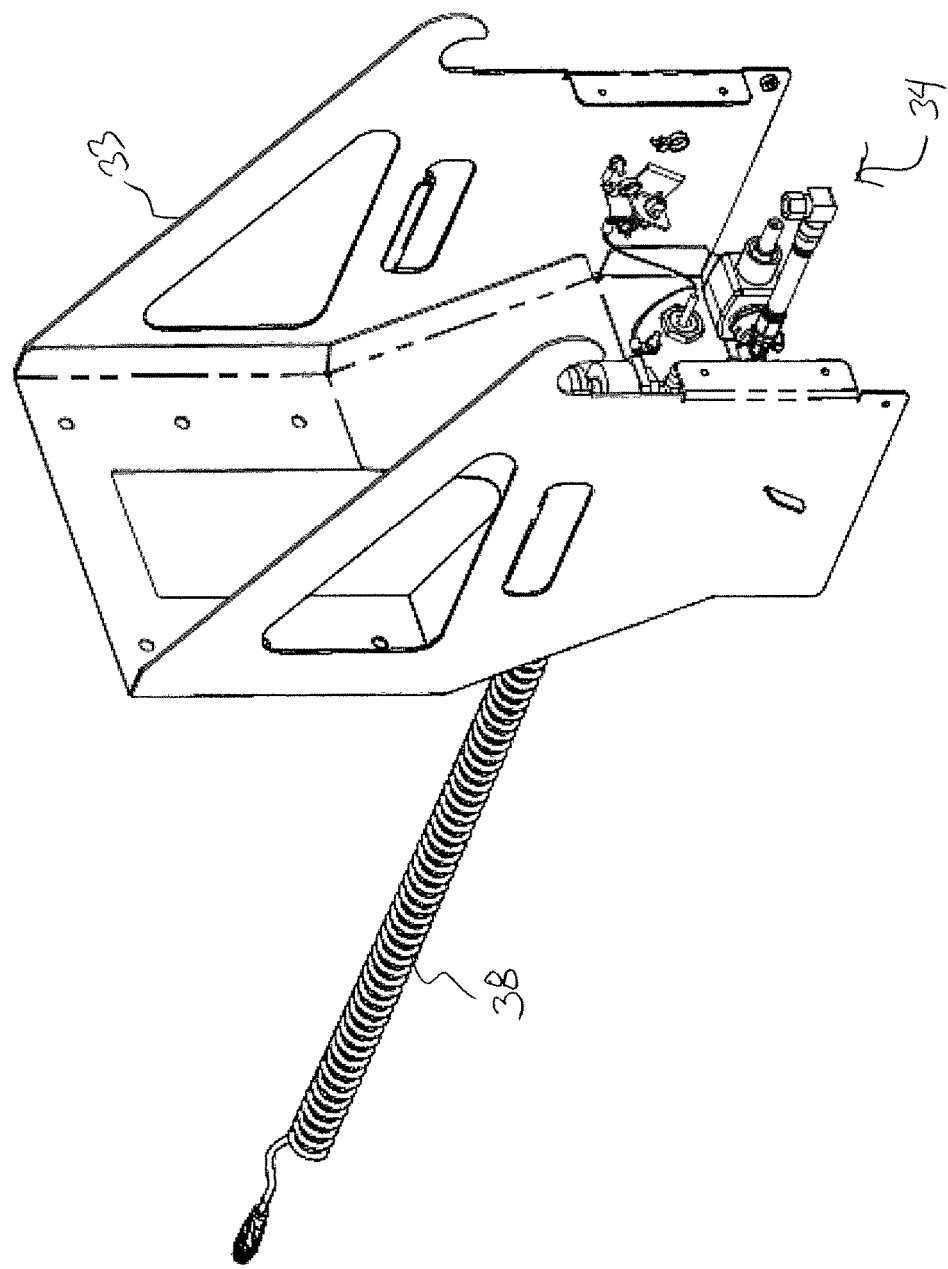
FIG. 3 is a perspective view of a chassis of a coolant supply system with the concentrate tank removed according to aspects of the subject technology.

FIG. 3 is a perspective view of chassis 33 with concentrate tank 32 removed according to aspects of the subject technology. Chassis 33 includes multi-valve manifold 34 arranged within chassis 33 and control line 38 extending away from chassis 33. Chassis 33 may be constructed from any type of material and arranged in any shape or configuration suitable for mounting coolant supply system 30 within machine tool 10. In the depicted example, control line 38 is a coiled line of electrical conductors used to communicate electrical signals between control system 20 and multi-valve manifold 34. Control line 38 may include standard or proprietary interface connectors at the ends of the coiled line to facilitate easy attachment and removal off coolant supply system with respect to control system 20 and coolant storage tank 42. Other connection mechanisms may be used within the scope of the subject technology.

Figure 4:
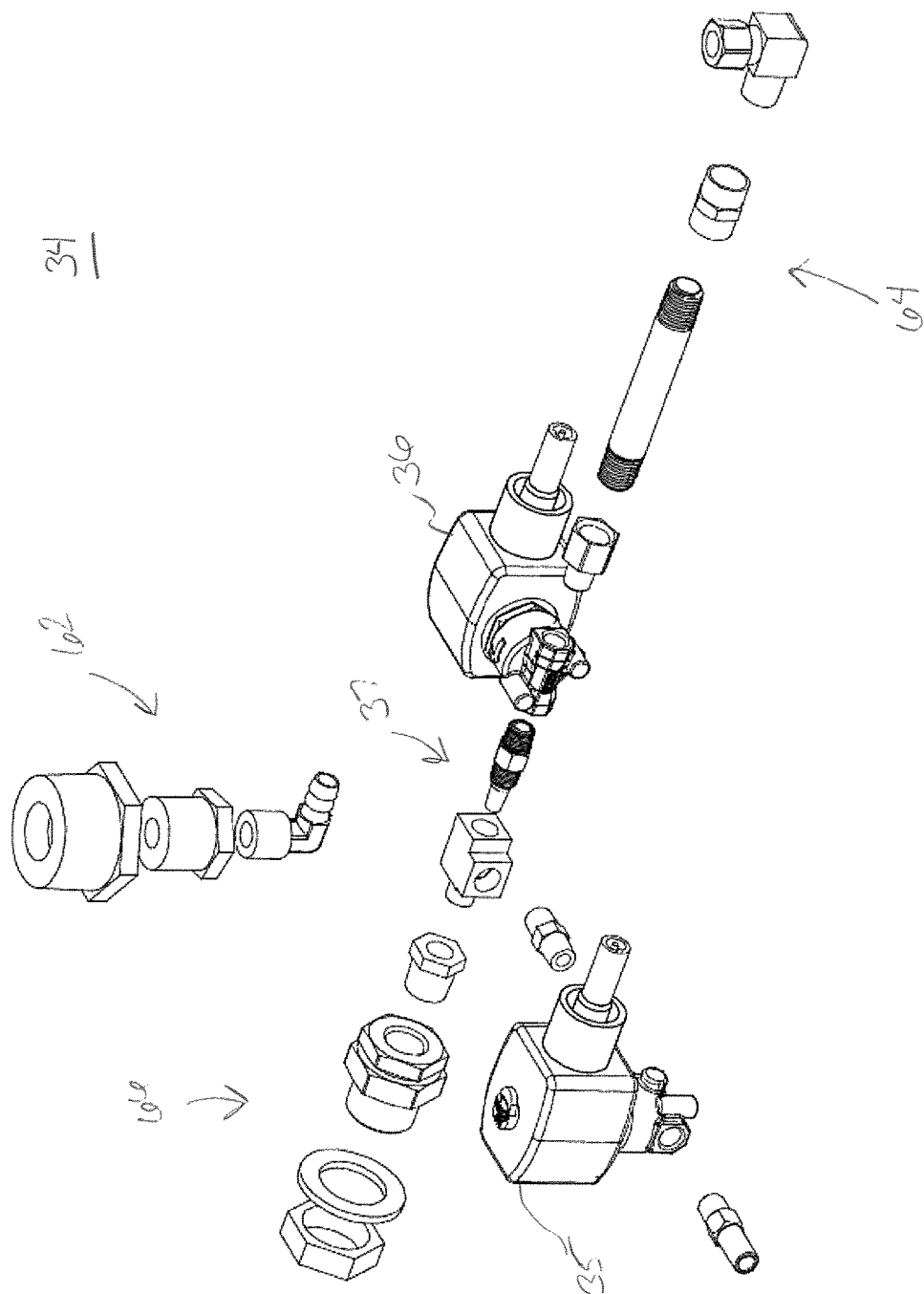
FIG. 4 is an exploded perspective view of a multi-valve manifold according to aspects of the subject technology.

FIG. 4 is an exploded perspective view of multi-valve manifold 34 according to aspects of the subject technology. As illustrated, multi-valve manifold 34 includes first flow control valve 35, second flow control valve 36 and mixer 37. Also depicted in the figure are fittings 62 for coupling first flow control valve 35 to concentrate tank 32 via a hose or line (not shown), fittings 64 for coupling second flow control valve 36 to a water supply line such as water supply line 39 shown in FIG. 2, and fittings 66 for dispensing the mixed coolant such as through coolant dispensing line 41 shown in FIG. 2. First flow control valve 35 and second flow control valve 36 are depicted as identical solenoid purge valves. As noted above, different types of valves may be used and first flow control valve 35 and second flow control valve 36 need not be the same type of valve. The combination and arrangement of the components of multi-valve manifold 34 may vary depending on the sizes and arrangement of the other components within coolant supply system 30. FIG. 4 is intended to illustrate example arrangements without limiting the possible scope of arrangements.

Figure 5:
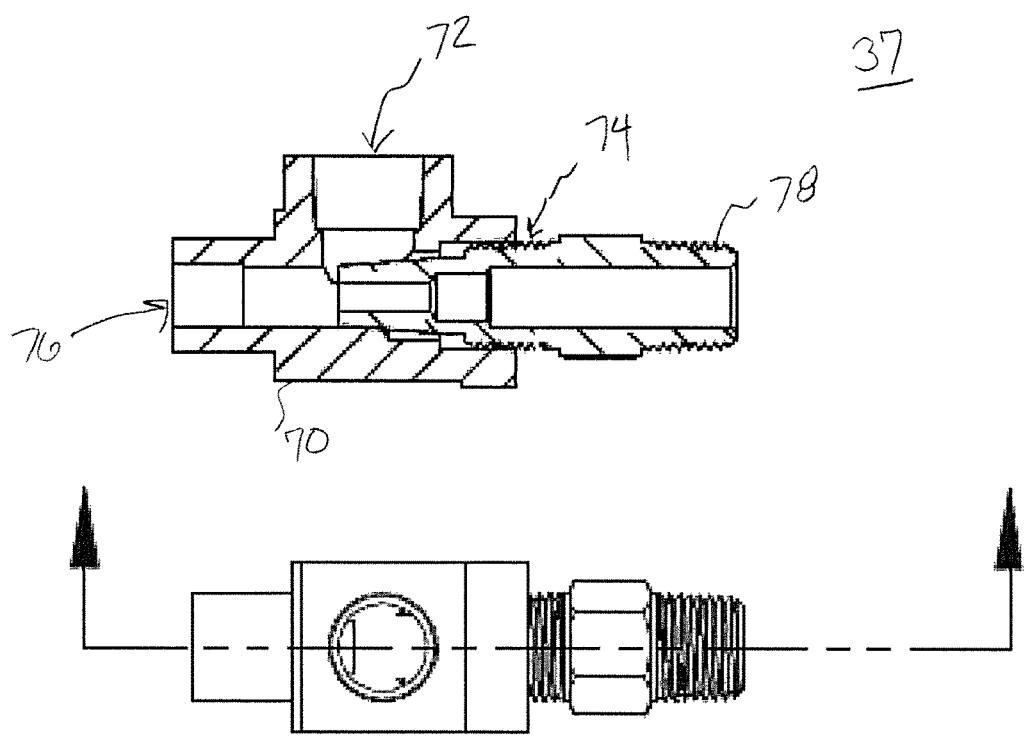
FIG. 5 is a cross-sectional diagram of a mixer from a multi-valve manifold of a coolant supply system according to aspects of the subject technology.

FIG. 5 is a cross-sectional diagram of mixer 37 from multi-valve manifold 34 according to aspects of the subject technology. As depicted in FIG. 5, mixer 37 includes three-way fitting 70, which includes first inlet 72, second inlet 74 and outlet 76. First inlet 72 of fitting 70 is configured to be coupled to first flow control valve 35 for supplying coolant concentrate from concentrate tank 32. Second inlet 74 of fitting 70 is configured to receive venturi nozzle 78 and be coupled to second control valve 36 via venturi nozzle 78 for supplying water from a water source. Outlet 76 is configured to dispense the coolant mixed within mixer 37 using the supplied concentrate and water according to the ratio controlled by actuation of first flow control valve 35 and second flow control valve 36. Outlet 76 may be coupled to coolant dispensing line 41 using the fittings and components illustrated in FIG. 4, for example.

Venturi nozzle 78 is illustrated with an inner diameter of the nozzle reducing through three sections within the nozzle. The broadest section of nozzle 78 is arranged to receive the supplied water and the narrowest section of nozzle 78 is arranged to deliver the water into an internal chamber of fitting 70 with a larger cross-section than the narrowest section of nozzle 78. This change in the flow path of water through nozzle 78 and into fitting 70 is designed to create a venturi effect within the fitting and draw concentrate into the flow of water via the first inlet 72. According to aspects of the subject technology, the concentrate in concentrate tank 32 is not pressurized and delivery of the concentrate into the flow of water to create the coolant at a certain concentration relies on the venturi effect to deliver the concentrate. Accordingly, when second flow control valve 36 is turned off, thereby stopping the flow of water into mixer 37, the flow of the concentrate into mixer 37 is also effectively stopped. The subject technology is not limited to this type of delivery mechanism for the concentrate. For example, a pump could deliver concentrate into the mixer and/or concentrate tank 32 could be pressurized to inject concentrate into mixer 37 upon actuation of first flow control valve 35.

The pressure could be controlled to control the amount of concentrate injected and thereby the ratio used to mix the coolant.

The multi-valve manifold 34 and mixer 37 depicted in FIGS. 4 and 5 are intended to represent examples within the scope of the subject technology. The subject technology is not limited to these examples and may be implemented using other combinations and arrangements of components that allow for the flow control and mixture of a concentrate with water according to a controlled ratio to produce a mixed coolant.

Various operating parameters of machine tool 10 may be used to control the automatic mixing and dispensing of coolant by coolant supply system. These operating parameters may be detected by control system 22 using one or more sensors or through execution of programs for operating machine tool 10. One or more of the operating parameters may be manually entered by an operator of machine tool 10 via user I/F 26 of control system 20. The operating parameters may be entered/detected values or may require computation by control system 20 based on entered/detected values.

The operating parameters may include a current level/amount of coolant stored in coolant storage tank 42 and an estimated amount (e.g., number of gallons) of coolant consumed per unit of time (e.g., hour) during operation of cutting tool 50. These parameters may be input by the operator based on the experience and/or observations of the operator. The estimate may be determined using sensor 46 to monitor the level of coolant in coolant storage tank 42 during operation of machine tool 10. By periodically determining the coolant level in coolant storage tank 42 before, during and after completing a machining process, the amount of coolant consumed by that machining process can be estimated.

Operating parameters also may include a current level of concentrate stored in concentrate tank 32. The level may be determined using a sensor mounted in or adjacent to concentrate tank 32. The sensor output may be obtained by control system 20 to determine the current concentrate level. The current concentrate level may be provided for display to the operation of machine tool 10 using user I/F 26. The current concentrate level also may be used to estimate how much coolant can be generated at a current mixing ratio before the concentrate in concentrate tank 32 should be replenished.

Operating parameters also may include a specified concentration for the coolant to be used for a machining operation. The specified concentration may be manually input by the operator of machine tool 10. The specified concentration may be associated with a particular machining program loaded up for execution by control system 22 and looked up when the machining program is selected for execution. The specified concentration may be used by control system 20 to determine the ratio at which the concentrate is mixed with water at the multi-valve manifold 34 to produce the coolant for replenishing coolant storage tank 42.

According to aspects of the subject technology, the concentration of coolant stored in coolant storage tank 42 may be different than the specified concentration set as the operating parameter for the next machining operation. Control system 22 may be configured to determine the current concentration of the coolant in tank 42 using sensor input or manual input by the operator. Using the current concentration of coolant in tank 42 together with the amount of coolant in tank 42, control system 22 may determine a concentration of new coolant to be dispensed into the existing coolant that will result in a new concentration of coolant in tank 42 that aligns with the specified concentration. This determination may be updated by control system 22 as coolant is mixed and added to tank 42 thereby gradually shifting the overall concentration of coolant in tank 42.

Operating parameters also may include a coolant concentration adjustment to allow the operator to increase or decrease the concentration of coolant being mixed and dispensed into tank 42 to bring the concentration of the coolant in tank 42 into alignment with the specified concentration parameter. The concentration adjustment may be used to calibrate coolant supply system 30 to account for variations in the water supply pressure/flow rate, viscosity of the concentrate in concentrate tank 32, dimensions and types of fittings and valves used within multi-valve manifold 34. For example, an operator may set a specified concentration as a target baseline for the mixing ratio or concentration set point. After mixing an amount of coolant using the mixing ratio based on the specified concentration, the concentration of the dispensed coolant may be determined and compared against the specified concentration. If the concentration is rich or lean relative to the specified concentration, the coolant concentration adjustment parameter can be set to increase or decrease the concentration percentage depending on the measured concentration value. This process of measuring mixed coolant and setting the coolant concentration adjustment parameter may be repeated as needed until the mixed coolant has a concentration within a preferred range of the specified concentration. Once the system is calibrated in this manner, the specified concentration parameter may be changed either automatically by control system 20 or manually by an operator and the coolant will be mixed within the preferred range of the specified concentration. If the type of coolant concentrate is changed or components of coolant supply system 30 modified/replaced, the calibration process may need to be repeated.

Operating parameters also may include an amount of time between refill operations by coolant supply system 30 to replenish the coolant in storage tank 42. The amount of time may be indicated in seconds, minutes, hours, etc. The amount of time may reflect an amount of operating time performed by machine tool 10, while ignoring time during which machine tool 10 is idle. Control system 20 may track an accumulated time of operation during which machine tool 10 is running. Once the accumulated time of operation reaches the designated amount of time between refills, control system 20 may control coolant supply system 30 to replenish the coolant according to the specified coolant concentration.

Delaying refill operations by coolant supply system 30 rather than configuring the system to continuously replenish coolant based on a level of coolant in coolant storage tank 42 dropping below a threshold, allows coolant in storage tank 42 to reach concentration equilibrium. Checking coolant levels and concentration values between refill operations also helps control system 20 and/or the operator evaluate the causes of coolant loss, such as being carried away by chips of material removed from the recirculating coolant or by evaporation. For example, if after the time between refill operations has lapsed the measured concentration is higher than the specified concentration, coolant loss may be due to evaporation of the water in the coolant more than being carried away during chip removal. Alternatively, if the concentration remains relatively consistent, coolant loss may be attributed more to chip removal than evaporation.

The specified concentration and/or the coolant concentration adjustment parameters may be modified to account for evaporation loss by lowering the concentration of the mixed coolant being dispensed into coolant tank 42, for example.

Operating parameters also may include a pressure or flow rate of the water supplied to coolant supply system 30. The pressure or flow rate may be manually entered by an operator of machine tool 10 or may be determined by control system 20 using one or more sensors arranged to detect the pressure or flow rate of the supplied water. This operating parameter may be used to set the ratio for mixing the coolant to a specified concentration. The parameter also may be used to determine an amount of time needed to replenish the coolant in tank 42 to a specified level and, together with the determined rate for consuming the coolant, may be used by control system 22 to determine when to perform refill operations during operation of machine tool 10 or possibly between operations of machine tool 10 if the rate or pressure of the water does not allow the coolant to be replenished as fast as the coolant is consumed during operation.

Coolant supply system 30 may be configured to keep the coolant tank topped off with mixed coolant automatically without operator intervention to initiate a refill operation. Coolant carried out with chips generated to machining operations is a primary cause of coolant loss. The refill volume of coolant may be predicated on the timed run period of the machine tool's flood coolant pump used to deliver the coolant to components of the machine tool. Based on initial measurements, an expectation may be determined as to the amount of mixed coolant that will be dispensed into the coolant tank. A ratio of pump on-time to the volume of mixed coolant may be adjustable by the operator based on particular machine operating conditions. For example, an application that generates small aluminum chips may use more coolant than an application that generates large steel chips and therefore may require more refill coolant per hour of pump time. Conversely a machine equipped with a screw type auger may use less coolant than that same machine fit with a conveyor. Accordingly, the user interface may include user selectable attributes such as a choice between belt conveyor and screw auger and steel versus aluminum to facilitate different ratios of refill period to pump on times for different configurations and conditions. Additional testing to establish start point refill ratios for these specific conditions may be performed before assigning a refill ratio.

One or more examples of operation will now be described according to aspects of the subject technology. An operator of the machine tool may start by entering an ideal or specified concentration level for the particular coolant and his application into the control system using a user interface display and input devices of user I/F 26. The operator also may determine the actual concentration level of the existing coolant in the coolant tank using a spectrometer or another sensor. The operator also may verify functionality of the coolant sensor (e.g., level float sensor) used to determine the level of coolant in the coolant tank. Functionality of the level float sensor is important because the control system will look at the output of this device to avoid over-filling the coolant tank. According to aspects of the subject technology, the filling/mixing of the coolant may occur only when a flood coolant pump is running to deliver the coolant to the components of the machine tool requiring coolant.

As noted above, control system 20 may use the specified coolant concentration value compared with the actual coolant concentration value to determine a refill coolant mix ratio that will be used to control multi-valve manifold 34 to mix and dispense coolant into coolant tank 42. The goal is to automatically maintain the coolant level in the tank at the prescribed mix ratio by refilling lost coolant with premixed coolant of the proper concentration.

Figure 6:
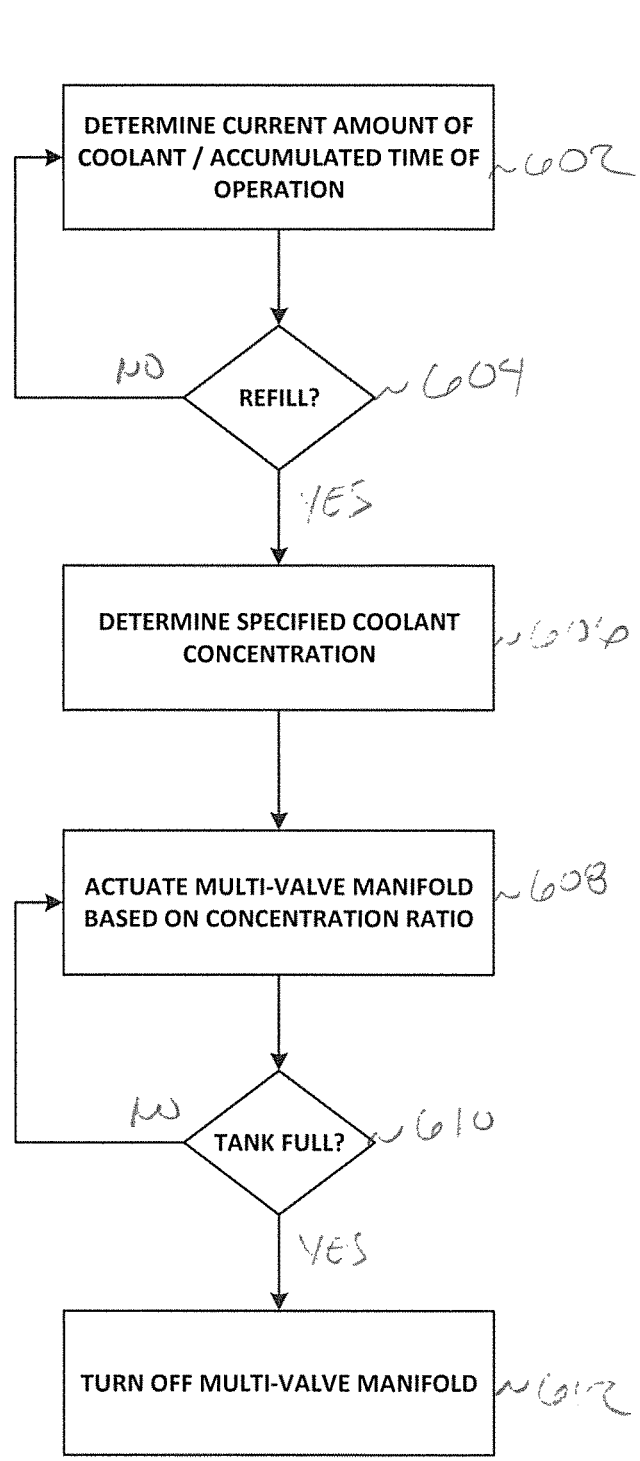
FIG. 6 is a flowchart illustrating a process for maintaining coolant levels in a machine tool.

FIG. 6 is a flowchart illustrating a process for maintaining coolant levels in a machine tool. Process 600 illustrated in FIG. 6 includes control system 20 determining a current amount of coolant stored in coolant storage tank 42 or an accumulated time of operation for machine tool 10 since a previous refill operation in block 602. The current amount of coolant in tank 42 may be determined using sensor 46. The current amount of coolant in tank 42 also may be determined using the accumulated time of operation and a determined consumption rate of the coolant.

Control system 20 determines in block 604 whether to initiate a refill operation to replenish the coolant in coolant storage tank 42. Control system 20 may base the determination on the current amount of coolant in tank 42. For example, if the coolant level drops below a threshold, a refill operation may be initiated. The threshold level may be determined using an expected duration of a next operation to be performed by machine tool 10 together with an expected consumption rate of coolant during that operation. Control system 20 also may determine to initiate a refill operation by comparing the accumulated time of operation with the operating parameter specifying time between refill operations. If the accumulated time exceeds to the operating parameter, a refill operation may be initiated.

Control system 20 determines a specified coolant concentration in block 606. As noted above, the specified concentration ratio may be manually entered into control system 20 by an operator of machine tool 10 or may be determined based on the current machining operation to be performed, for example. Using the processes described above, control system 20 sends control signals to multi-valve manifold 34 to actuate the flow control valves to mix concentrate and water at a determined ratio to replenish the coolant in storage tank 42 in block 608.

In block 610, control system determines whether the coolant in storage tank 42 has reached a full level. This determination may be based on output from sensor 46 or from the flow rate of the water supply and an amount of time the refill operation has been operating. If the coolant has reached a full level in storage tank 42, control system 20 turns off flow control valves in multi-valve manifold 34 to stop the refill operation.

The following is another algorithm for operation of coolant supply system according to aspects of the subject technology: (1) (pump on time)×(coolant refill rate) is summed into (accumulated coolant loss); (2) when pump run time has exceeded Replacement Time, start refill function; (3) replacement time=(accumulated loss amount)/(Water Supply GPM); (4) concentrate valve ratio on=(concentrate ratio %)×(mixture correction %); (5) concentrate pulse rate between 1/4 and 2 seconds; (6) re-fill stops if coolant level gets above 99%.

Figure 7:
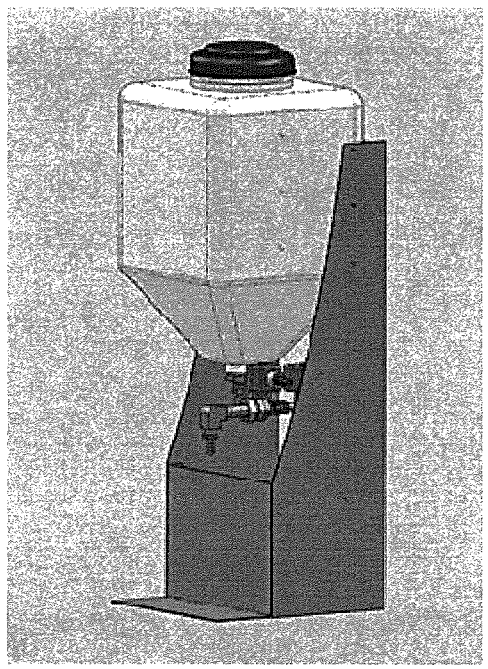
FIG. 7 is a depiction of a stand-alone floor mount for a coolant supply system according to aspects of the subject technology.
Figure 8:
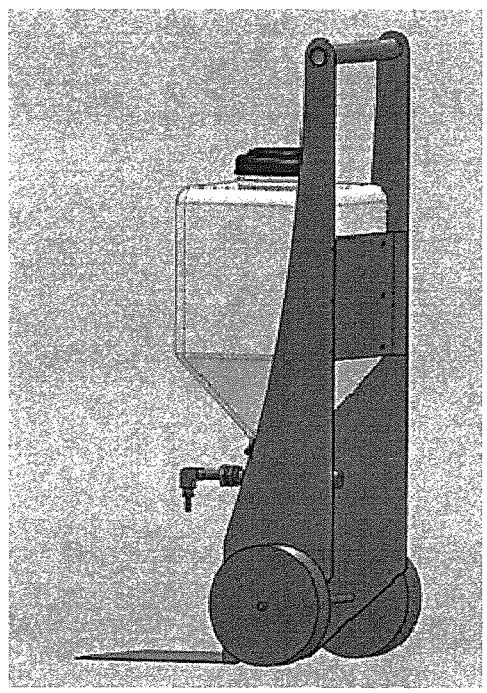
FIG. 8 is a depiction of a hand-truck mount for a coolant supply system according to aspects of the subject technology.

As illustrated in FIG. 2, coolant supply system 30 may be mounted to a coolant tank handle, either with fasteners or detachable hung from the handle. Alternatively, coolant supply system may be arranged on a stand-alone floor mount to position coolant supply system 20 relative to coolant storage tank 42. An example of a stand-alone floor mount is depicted in FIG. 7. An another alternative, coolant supply system 20 may be arranged using a hand truck mount to position coolant supply system 20 relative to coolant storage tank 42. An example hand truck mount is depicted in FIG. 8. Other mechanical arrangements may be used to mount the coolant concentrate tank and control mixing valves with respect to the coolant tank of a machine tool. The different arrangements allow for use of the system described herein in a variety of machine types and machine installation arrangements. One or more cables (not shown) may be used to connect the control system to the control mixing valves and additional supply lines/pipes (not shown) are used for delivery of the mixed coolant and supply water.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, non-transitory, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as an LCD monitor, for displaying information to the user and a keyboard and a pointing device, such as a mouse or a trackball, by which the user can provide input to the computer. Other kinds of devices are used to provide for interaction with a user as well; for example, feedback provided to the user can be any form of sensory feedback, such as visual feedback, auditory feedback, or tactile feedback; and input from the user can be received in any form, including acoustic, speech, or tactile input.

It is understood that any specific order or hierarchy of blocks in the processes disclosed is an illustration of example approaches. Based upon design preferences, it is understood that the specific order or hierarchy of blocks in the processes are rearranged, or that all illustrated blocks be performed. Some of the blocks are performed simultaneously. For example, in certain circumstances, multitasking and parallel processing is advantageous. Moreover, the separation of various system components in the implementations described above should not be understood as requiring such separation in all implementations.

The previous description is provided to enable any person skilled in the art to practice the various aspects described herein. Various modifications to these aspects will be readily apparent to those skilled in the art, and the generic principles defined herein are applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject disclosure or that such aspect applies to all configurations of the subject disclosure. A disclosure relating to an aspect may apply to all configurations, or one or more configurations. A phrase such as an aspect may refer to one or more aspects and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A machine tool, comprising:
a cutting tool;
a cooling system comprising a coolant storage tank and a pump;
a control system configured to control operation of the cutting tool to remove material from a workpiece and operation of the pump to supply coolant from the coolant storage tank to one of the cutting tool or the workpiece during operation of the cutting tool,
wherein the control system comprises a user interface configured to receive and display operator input of operating parameters comprising an estimated consumption rate of coolant during operation of the cutting tool, a specified concentration of the coolant, and an amount of operating time between refill operations; and
a coolant supply system comprising:
a concentrate tank; and
a multi-valve manifold configured to mix a concentrate from the concentrate tank with water received via a water supply line into a coolant and dispense the coolant into the coolant storage tank,
wherein the control system is further configured to control the coolant supply system to automatically mix and dispense the coolant into the coolant storage tank based on the operating parameters of the machine tool.

2. The machine tool of claim 1, wherein the coolant supply system further comprises:
a chassis configured to mount the coolant supply system to the coolant storage tank of the machine tool, wherein the concentrate tank is arranged within the chassis.

3. The machine tool of claim 2, wherein the chassis is configured to detachably mount the coolant supply system to the coolant storage tank of the machine tool.

4. The machine tool of claim 1, further comprising a level sensor arranged in the coolant storage tank, wherein the operating parameters include a current amount of coolant stored in the coolant storage tank and the control system is further configured to determine the current amount of coolant stored in the storage tank based on an output of the level sensor.

5. The machine tool of claim 4, wherein the control system is further configured to determine the estimated consumption rate of coolant consumed during operation of the cutting tool based on periodic outputs of the level sensor during operation of the cutting tool.

6. The machine tool of claim 1, wherein the control system is configured to control the coolant supply system to mix the concentrate and the water at a ratio based on the specified concentration.

7. The machine tool of claim 6, further comprising a concentration sensor arranged in the coolant storage tank, wherein the control system is configured to determine a current concentration of the coolant stored in the coolant storage tank and to determine the ratio based on the current concentration of the coolant and the specified concentration of the coolant.

8. The machine tool of claim 6, wherein the multi-valve manifold comprises:
a first flow control valve coupled to the concentrate tank;
a second flow control valve coupled to the water supply line;
a mixer configured to mix the concentrate with water into the coolant, the mixer comprising:
a first inlet coupled to the first flow control valve and configured to receive the concentrate from the concentrate tank via the first flow control valve;
a second inlet coupled to the second flow control valve and configured to receive the water from the water supply line via the second flow control valve; and
an outlet configured to dispense the coolant into the coolant storage tank,
wherein the control system is further configured to actuate the first flow control valve and the second flow control valve to control the ratio of the concentrate and the water supplied to the mixer based on the specified concentration of the coolant.

9. The machine tool of claim 8, wherein the mixer comprises a venturi nozzle arranged in the second inlet of the mixer and configured to create a venturi effect with the supplied water to draw the concentrate into the mixer via the first inlet of the mixer.

10. The machine tool of claim 8, wherein at least one of the first flow control valve or the second flow control valve comprises a solenoid valve.

11. The machine tool of claim 1, wherein the coolant supply system is detachably mounted to the coolant storage tank.

12. A computer-implemented method, comprising:
receiving operator input of operating parameters comprising an estimated consumption rate of coolant during operation of a cutting tool, a specified concentration of the coolant and an amount of operating time between refill operations;
determining an accumulated time of operation of the cutting tool;
determining a current amount of coolant stored in a coolant storage tank based on the estimated consumption rate and the accumulated time of operation; and
actuating a multi-valve manifold to mix a concentrate from a concentrate tank and water from a water supply line into the coolant at a ratio based on the specified concentration and a volume based on the current amount of coolant stored in the coolant storage tank,
wherein the multi-valve manifold is automatically actuated and the coolant dispensed into the coolant storage tank based upon the operating parameters.

13. The computer-implemented method of claim 12, further comprising:
determining a current concentration of the coolant stored in the coolant storage tank; and
determining the ratio based on the determined current concentration and the determined specified concentration.

14. The computer-implemented method of claim 12, further comprising:
actuating the multi-valve manifold to stop the automatic dispensing of the coolant into the coolant storage tank based on the determined current amount of coolant stored in the coolant storage tank exceeding a threshold value.

15. The computer-implemented method of claim 12, wherein the multi-valve manifold comprises:
a first flow control valve coupled to the concentrate tank;
a second flow control valve coupled to the water supply line;
a mixer configured to mix the concentrate with water into the coolant, the mixer comprising:
a first inlet coupled to the first flow control valve and configured to receive the concentrate from the concentrate tank via the first flow control valve;
a second inlet coupled to the second flow control valve and configured to receive the water from the water supply line via the second flow control valve; and
an outlet configured to dispense the coolant into the coolant storage tank, wherein actuating the multi-valve manifold comprises:
actuating the second flow control valve to supply the water from the water supply line to the mixer; and
actuating the first flow control valve at a determined pulse rate to supply the concentrate from the concentrate tank to the mixer at the ratio.

* * * * *